UNITED STATES PATENT OFFICE.

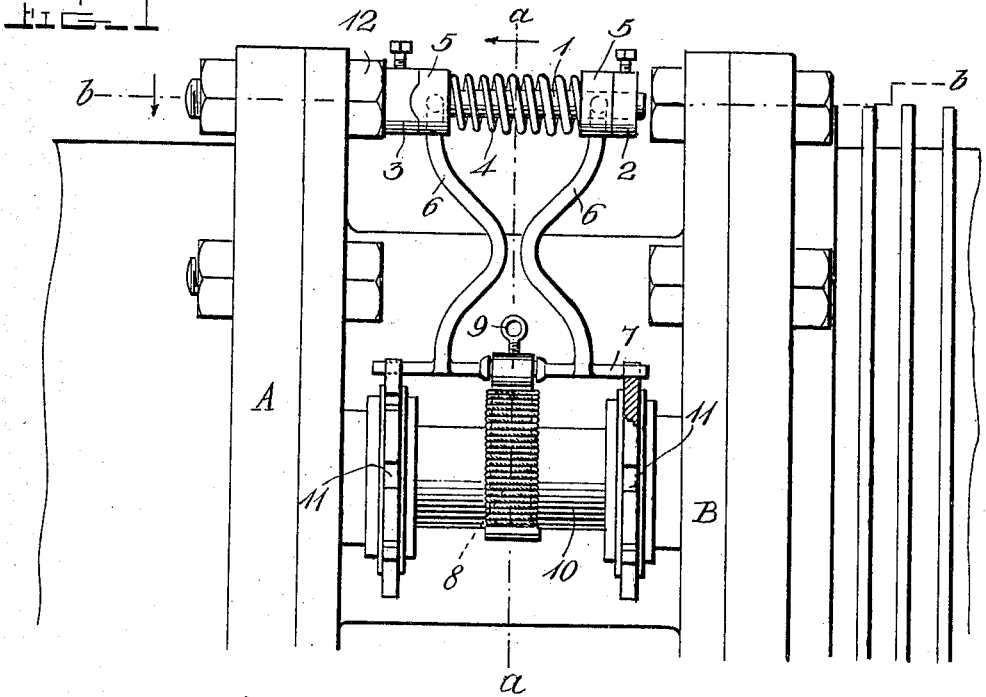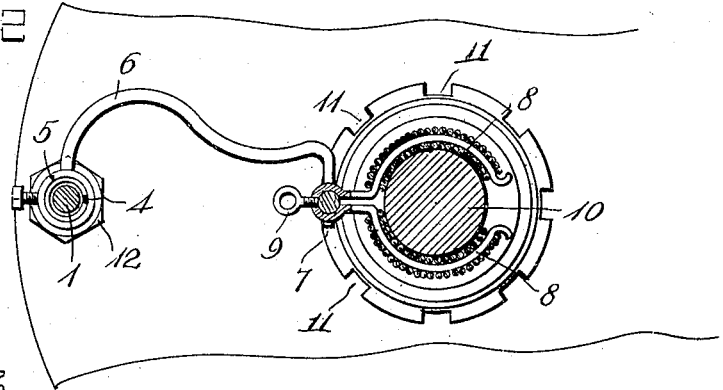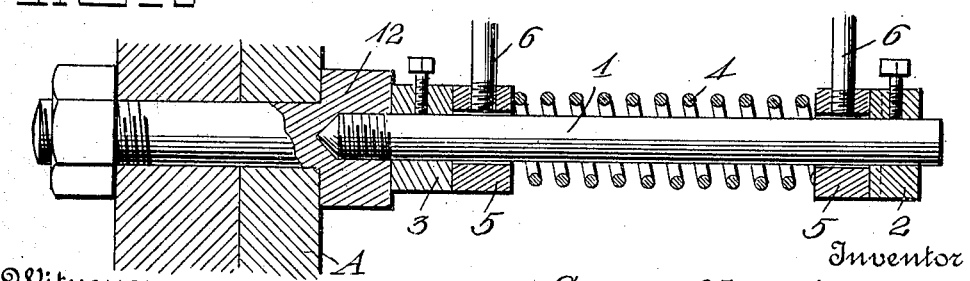

GEORGE CHRISTENSON, OF NEVADA, MISSOURI.

GLAND-LOCK AND SWAB.

No. 891,910.   Specification of Letters Patent.   Patented June 30, 1908.

Application filed October 14, 1907. Serial No. 397,445.

*To all whom it may concern:*

Be it known that I, GEORGE CHRISTENSON, a citizen of the United States, residing at Nevada, in the county of Vernon and State of Missouri, have invented certain new and useful Improvements in Gland-Locks and Swabs; and I do declare the following to be a full, clear, and exact description of the invention, such as will enable others skilled in the art to which it appertains to make and use the same.

My invention relates to devices designed for use upon pumping machines, air compressors, and the like, for securing the packing-box nuts in position and for cleaning the moving piston rod.

The object of my invention is to provide a device of this character which will prove efficient, durable, easy to adjust and which may be applied to existing machines without appreciable change.

With this and other objects in view, the invention consists of certain novel features of construction, combination and arrangement of parts, as will be more fully described and particularly pointed out in the appended claims.

In the accompanying drawings is shown an embodiment of my invention. Like characters being used to indicate similar parts in the different views.

Figure 1 is a side view, showing the device mounted between contiguous cylinder heads of a pump, of which the dotted lines show outlines. Fig. 2 is a sectional view substantially along the line a—a of Fig. 1; while in Fig. 3 is shown a longitudinal section of the supporting rod and the parts immediately carried thereby.

The device consists of a screw threaded rod, 1, bearing upon one of its ends a nut, 2, and upon the other end a sleeve, 3. The nut and sleeve are each provided with a set screw for the purpose of fixedly securing them upon the rod. Mounted upon the body of the rod is a spiral spring, 4, its ends bearing against sleeves, 5—5, designed to slide upon the rod and having flange and socket engagement upon their outer ends, respectively, with the nut, 2, and sleeve, 3. Fixedly secured to each of the sleeve members, 5 and 5, is a spring arm 6—6. A rigid metallic bar, 7, connects the outer end of the spring arms, 6—6, being welded or otherwise secured thereto upon one of its edges and intermediate its end. These parts are so connected that the bar, 7, shall lie in a plane parallel with the axis of the rod, 1.

A portion of the bar, 7, approximately midway between its ends is suitably shaped to form a bearing surface for a pair of spring arms, 8—8. These arms are formed from a strip of spring metal, bent at its central point to form a bearing sleeve from which its arms curve outwardly, with respect to each other, then inwardly. Candlewick, or other textile material, is to be wound upon each of these arms which, in use, grasp the exposed portion of the piston rod, 10, and remove grit therefrom. Upon that portion of the arms 8—8 which bears upon the bar, 7, is mounted a handle or key, 9, by which they may be removed from engagement with the piston rod.

The bar, 7, bears at its ends in one of the slots of each of the packing-box nuts, 11—11 serving to lock the same against displacement.

When it is desired to mount the device, a bolt in either of the contiguous cylinder heads, A or B, is selected, preferably one near the upper portion of the cylinder (12 in the drawing, for example), a suitably screw threaded bore produced in its outer end, and one end of the rod, 1, secured therein. By manipulation of the nut, 2, upon the other end of the rod, 1, a rigid support is secured for that end, either against a bolt-head, as shown, or against the cylinder head. The bar, 7, is now brought into engagement with convenient slots of the alined packing-box nuts, and the adjustment is complete. The bar or foot, 7, may be removed from engagement with the nuts by rotating it upon the rod, 1, through the arms, 6—6, such rotation being resisted by the flanges upon the sleeves, 5—5, pressed into sockets in nuts, 2, and sleeve, 3, by the spring, 4.

Having thus described the nature of my invention, what I claim as new and desire to secure by Letters-Patent, is:

1. In combination, a pair of contiguous cylinder heads, a piston rod adapted to reciprocate therebetween, stuffing boxes for said piston rod, flanged nuts on said stuffing box having notches in the flanges thereof, a supporting rod passing through a flange of the head of one of said cylinders and positioned parallel to said piston rod, a sleeve having a radially extending notch and mounted on the inner end of said supporting rod, a collar mounted on the outer end of said supporting rod, set screws to hold said collar and sleeve in position, inner sleeves rotatably mounted on said supporting rod between and in contact with said notched sleeve and said collar, a spiral spring on said supporting rod for holding said inner sleeves in normal position, arms carried by said inner sleeves, a plate carried by said arms and normally engaging the notches of said flanged nuts, and a projection on one of said inner sleeves fitting the notch of said notched sleeve.

2. In combination, a pair of nuts screwed onto a supporting structure, a connecting rod passing through said nuts, a supporting rod fastened to said structure and disposed away from but parallel to said connecting rod, swinging means mounted on said supporting rod, and means to clamp said connecting rod to hold said swinging means in connection with said nuts.

In testimony whereof I have hereunto set my hand in presence of two subscribing witnesses.

GEORGE CHRISTENSON.

Witnesses:
G. G. Ewing,
W. A. Mason.